June 6, 1967　　　W. J. GREENLEAF　　　3,323,194
MILLING CUTTER
Filed Jan. 4, 1965
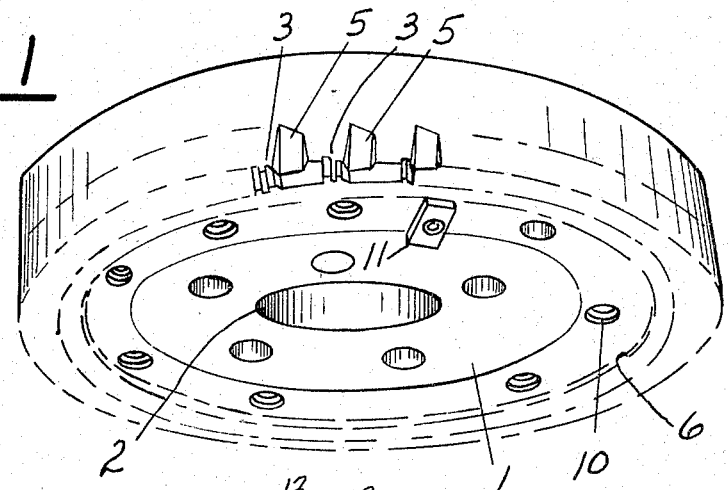
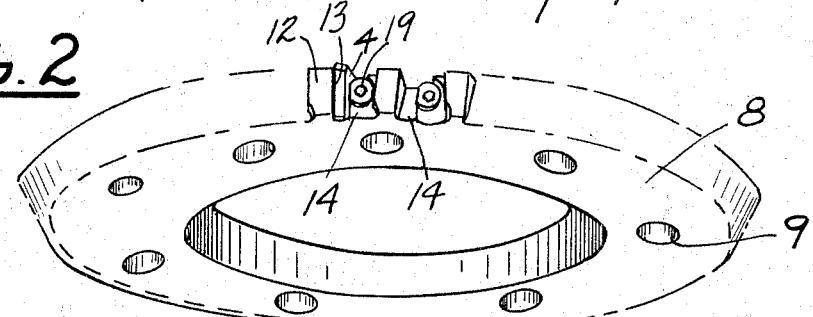
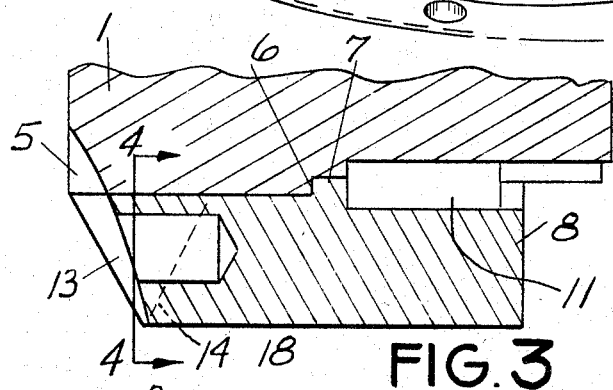
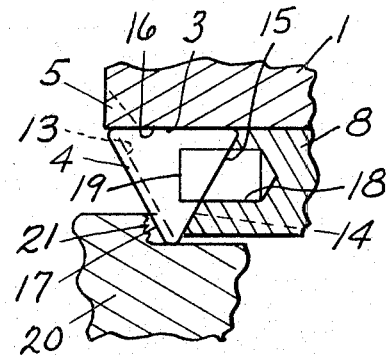
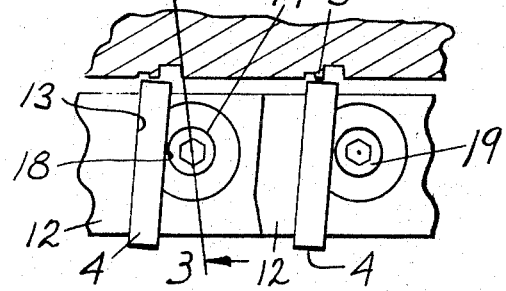
INVENTOR.
Walter J. Greenleaf
BY
Ralph Hammar
attorney

United States Patent Office 3,323,194
Patented June 6, 1967

3,323,194
MILLING CUTTER
Walter J. Greenleaf, 608 N. Main St. Ext.,
Meadville, Pa. 16335
Filed Jan. 4, 1965, Ser. No. 423,186
1 Claim. (Cl. 29—105)

This invention is a milling cutter in which indexable bits are mounted on a replaceable ring fixed to the front end of the cutter body. In a preferred form, the bit seats are integral projections on the periphery of the ring arranged so that the cutting load is primarily at the junction between the bit seats and the body of the ring, thereby increasing the strength and rigidity. An entire ring with the bits mounted thereon may be replaced as a unit, reducing the set up time.

In the drawing, FIG. 1 is a perspective of the body of a milling cutter, FIG. 2 is a perspective of the replaceable ring carrying the indexable bits, FIG. 3 is a section on line 3—3 of FIG. 4, FIG. 4 is a section on line 4—4 of FIG. 3, and FIG. 5 is a diagrammatic view illustrating the distribution of cutting loads.

In the drawing, 1 indicates the body of a milling cutter having at its center an arbor hole 2 and associated structure by which the cutter is fastened to a spindle. On the front end of the body around its periphery are a plurality of angularly spaced radially extending side seats 3 each engaging an edge of one of the indexable triangular or polygonal bits 4. In front of each of the bit seats 3 is a chip clearance groove 5. The bit seats 3 and chip clearance grooves 5 are easily machined to a high degree of accuracy in the body 1. Each bit seat locates and accurately positions one edge of the associated bit so that the position of the active cutting edge of the bit is not changed as the bit is indexed to bring a fresh cutting edge into cutting position.

Inward of the periphery of the body 1 is an annular recess or counterbore 6 receiving an annular projection 7 on a replaceable ring 8. The projection 7 and counterbore 6 are both concentric with the axis of the milling cutter. The ring and body are fastened together by the usual screws or bolts in holes 9 and 10. The driving torque on the ring is taken through a key 11 in the body fitting in a keyway (not shown) in the ring 8.

Extending through the periphery of the ring 8 are a plurality of axial slots defining integral outwardly projecting bit seat members 12 angularly spaced from each other on the same spacing as the seats 3 in the body 1. Each bit seat member 12 provides an end seat 13 for the bit 4. For the particular bits illustrated, the end seat 13 has substantially equilateral triangular shape of the bit. In front of each seat 13 is a side seat 14 engaging and locating an edge of the bit 4. Each seat 14 in the ring and the associated seat 3 in the body are angularly related to each other to receive two inactive edges 15, 16 of the bit (FIG. 5) and thereby position the bit so that the cutting edge 17 is accurately located with respect to the axis of the milling cutter. The inclination of the end seat 13 is such as to provide the required cutting clearance.

In front of each side seat 14 is a socket 18 in the ring parallel to the end seat 13. A bit clamp 19 of suitable construction, for example that of Patent 2,842,233, fits in the socket and clamps the bit against the end seat 13.

One advantage of this construction is that the cutter is stronger and therefore can take heavier cutting loads because the cutting thrusts are taken on the section of the end seats 13 closest to the ring 8. This is illustrated in FIG. 5 where the cutter is shown making a cut in a workpiece 20. It will be noted that the cutting load is taken in the bracketed section 21 of the cutting edge 17 which is adjacent the junction of the end seat 13 with the edge seat 14 in the ring 8. The cutting load is taken on the section of the end seat so close to the body of the ring 8 that an extremely rigid and strong construction is obtained. Another advantage of this construction is that spare replacement rings 8 can be set up in the tool room with the bits clamped in place. When the bits are worn, the ring with the worn bits is removed and the new ring bolted in place. This reduces set up time. The replacement ring also reduces the maintenance costs. The rings cost less to make than the body. The ring is easily machined to precise dimensions. After hardening, the bit seats may be finish ground by straight passes through the rim of the ring.

This invention is an improvement on Patents 2,805,467 and 2,805,469.

What is claimed as new is:

A face milling cutter having a body with an axially presented surface at its front end, a ring concentric with the axis of the cutter fastened to the body in front of said surface, said ring having a plurality of angularly spaced bit seat members integral with and projecting radially outward from the periphery of the ring, said members being of equilateral triangular shape with one side of the triangle adjoining the front face of the body, another side of the triangle extending axially across the rim of the ring and the third side of the triangle extending from the front of the ring radially outward and axially back toward the body, each member having an equilateral triangular end seat for an indexable equilateral triangular bit and a side seat at the junction of the member with the ring in front of the end seat for engaging and locating one edge of the bit with an adjoining edge of the bit at the front of the ring forming a cutting edge adjacent the junction of the member with the ring, the cutting edge projecting axially in front of the ring and body, the front end of the body having a seat for engaging and locating an edge of the bit adjoining said one edge at the back of the ring, and clamping means for holding the bit against said seats.

References Cited

UNITED STATES PATENTS 3,091,138   5/1963   Berry _____ 29—105 X

WILLIAM W. DYER, JR., *Primary Examiner.*

HARRISON L. HINSON, *Examiner.*